(12) United States Patent
San Solo et al.

(10) Patent No.: US 7,784,217 B2
(45) Date of Patent: Aug. 31, 2010

(54) FERTILIZATION GRATE AND TROUGH SYSTEM

(75) Inventors: Adam San Solo, North Miami Beach, FL (US); Rhonda Gracie, Davie, FL (US); Richard H. Purvis, Fishers, IN (US)

(73) Assignee: U.S. Foundry & Mfg. Corp., Medley, FL (US)

( * ) Notice: Subject to any disclaimer, the term of this patent is extended or adjusted under 35 U.S.C. 154(b) by 125 days.

(21) Appl. No.: 11/900,910

(22) Filed: Sep. 13, 2007

(65) Prior Publication Data

US 2009/0071070 A1 Mar. 19, 2009

(51) Int. Cl.
- A01G 29/00 (2006.01)
- A01G 25/06 (2006.01)
- E02B 11/00 (2006.01)

(52) U.S. Cl. .............. 47/48.5; 47/33; 405/43
(58) Field of Classification Search ............ 47/21.1, 47/79, 48.5; 405/36, 43–45, 39, 40, 118; 210/163, 164
See application file for complete search history.

(56) References Cited

U.S. PATENT DOCUMENTS

| | | | | |
|---|---|---|---|---|
| 355,185 A * | 12/1886 | Locke | ............... | 404/3 |
| 1,078,637 A * | 11/1913 | Naylor | ............... | 405/43 |
| 1,406,068 A * | 2/1922 | Padgett | ............... | 404/4 |
| 3,156,099 A * | 11/1964 | Dailey | ............... | 405/121 |
| 3,220,194 A * | 11/1965 | Lienard | ............... | 405/45 |
| 3,225,545 A * | 12/1965 | Flegel | ............... | 405/43 |
| 4,056,898 A * | 11/1977 | Brucato et al. | ............... | 47/48.5 |
| 4,102,135 A * | 7/1978 | Auriemma | ............... | 405/43 |
| 4,183,696 A * | 1/1980 | Auriemma | ............... | 405/43 |
| 4,308,688 A * | 1/1982 | Revane | ............... | 47/32.7 |
| 4,986,025 A | 1/1991 | Imperial | | |
| 5,383,302 A * | 1/1995 | Hill | ............... | 47/78 |
| 5,443,327 A * | 8/1995 | Akkala et al. | ............... | 405/118 |
| 5,735,637 A * | 4/1998 | Gunter | ............... | 405/118 |
| 5,803,662 A * | 9/1998 | Gunter | ............... | 405/119 |
| 5,853,265 A * | 12/1998 | Gunter | ............... | 405/118 |
| 6,132,137 A * | 10/2000 | Gunter | ............... | 405/36 |
| 6,569,321 B2 | 5/2003 | Coffman | | |
| 7,066,685 B2 | 6/2006 | Humphries et al. | | |
| 7,306,401 B1 * | 12/2007 | Linkogle | ............... | 405/118 |
| 2004/0136785 A1 * | 7/2004 | Gunter | ............... | 405/118 |

* cited by examiner

*Primary Examiner*—Rob Swiatek
*Assistant Examiner*—Kristen C Hayes
(74) *Attorney, Agent, or Firm*—Michael J. Colitz, III; Gray Robinson, P.A.

(57) ABSTRACT

Disclosed is a fertilization system that finds particular use within a paved surface. The invention allows the root structure of a plant or tree to be hydrated and fertilized by way of an expansible and configurable trough and grate assembly. The trough includes a number of different components that fit together with a tongue and groove interconnection. The trough includes drainage apertures that allow water to run through the grate and into an associated fertilization pit.

5 Claims, 8 Drawing Sheets

FERTILIZATION GRATE AND TROUGH SYSTEM

BACKGROUND OF THE INVENTION

1. Field of the Invention

The present invention relates to an improved fertilization grate and trench system. More specifically, the present invention relates to a grate and trough system that is expansible and which provides drainage and fertilization access into an associated fertilization pit.

2. Description of the Background Art

Drainage grates are known in the art and are used in collecting rain water, or water run off, and directing it into a trench where it can be removed and/or used to sustain plant life. Many drainage grates are used in areas that are particularly susceptible to the collection of standing water, such as sidewalks, parking lots, or other paved surfaces. Drainage grates in such high trafficked areas must not only allow for the passage of water, but must also accommodate foot or vehicle traffic.

One example of such a drainage grate is illustrated in U.S. Pat. No. 7,066,685 to Humphries. Humphries discloses a grate construction that includes an outer drainage grate and an inner reinforcing member. Metal strips can be added to the reinforcing member for the purpose of increasing the load rating.

Likewise, U.S. Pat. No. 6,569,321 to Coffman describes an apparatus for handling water drainage in an asphalt environment. The apparatus includes a grate that surrounds a tree within a sidewalk and associated aggregate. A slot is provided in an adjacent curb that allows for the passage of water runoff down to the tree roots. Coffman further discloses a two-stage water treatment system.

Finally, U.S. Pat. No. 4,986,025 to Imperial discloses a landscape apparatus utilizing grate sections to frame a tree trunk and surrounding soil. The apparatus includes four pie-shaped segments that are interlocked together. Each segment includes a floor with a matrix of apertures. The apparatus allows for water seepage to roots.

Although each of the above-referenced inventions achieves its own individual objective, each also suffers from one or more drawbacks. More specifically, the referenced inventions do not provide an easily expansible and configurable grate system that also provides sufficient support for vehicle and/or foot traffic. Likewise, the referenced inventions do not provide for an expansible and configurable grate system that allows particulate materials to be washed into an adjacent fertilization pit for use in sustaining plant life.

SUMMARY OF THE INVENTION

It is therefore one of the objects of the present invention to provide an improved fertilization grate that can be easily assembled from a number of individual components with minimal need for tools or fasteners.

It is a further object of the present invention to provide a grate that is adapted to be installed about a fertilization pit and wherein the grate functions in allowing hydration and nutrients to reach a root structure within the fertilization pit.

It is still yet a further object of the present invention to permit a drainage system to be easily and removably installed within a concrete surface, such as a sidewalk or roadway.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to a fertilization system that finds particular use within a paved surface. The invention allows the root structure of a plant or tree to be hydrated and fertilized by way of an expansible and configurable trough and grate assembly. The trough includes a number of different components that fit together with a tongue and groove interconnection. The trough includes drainage apertures that allow water to run through the grate and into an associated fertilization pit. The various components of the various invention, and the manner in which they interrelate, will be described in-greater detail hereinafter.

Figure 1:
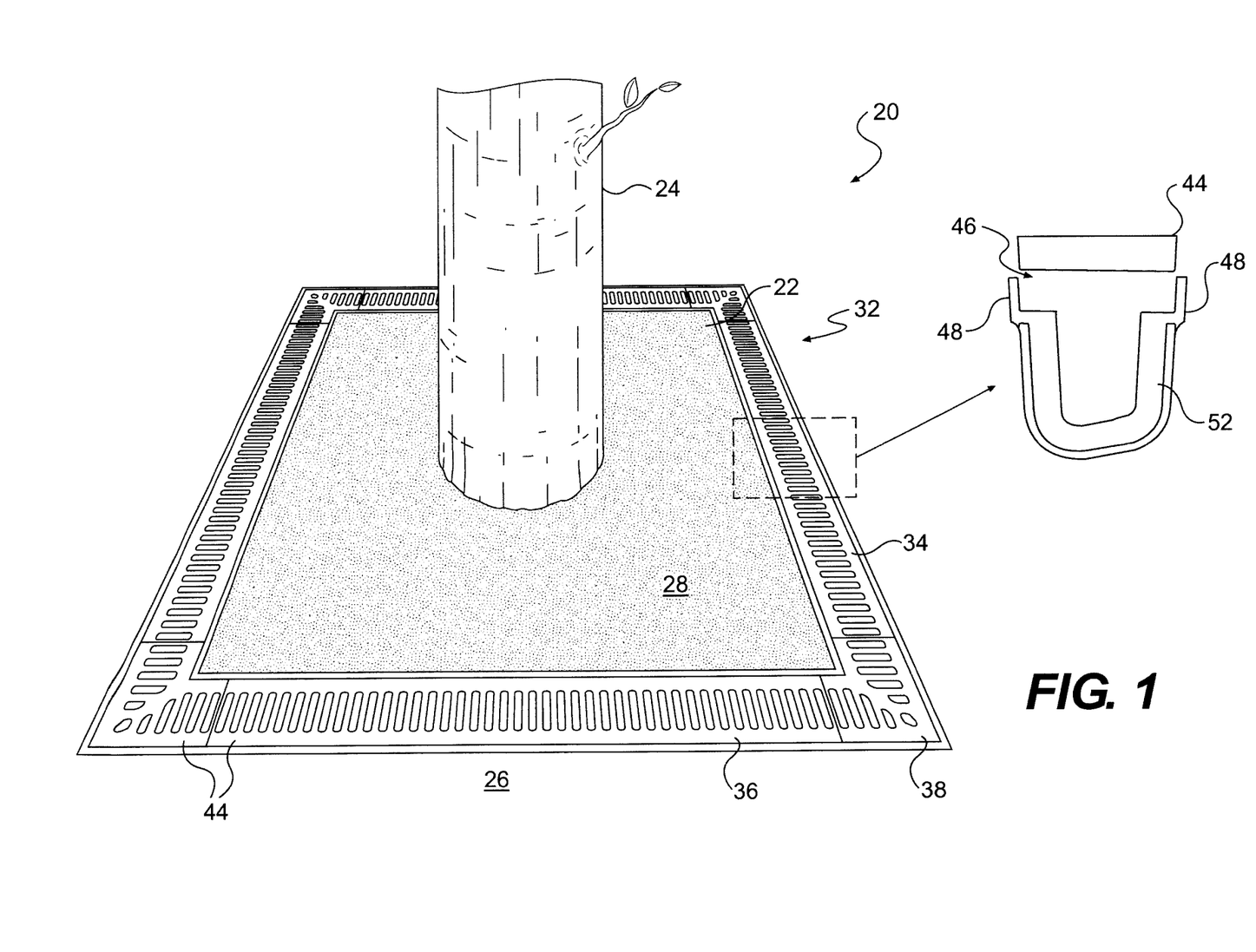
FIG. 1 is a perspective view of the improved fertilization grate of the present invention.

FIG. 1 is a perspective view of the fertilization system 20 and the associated fertilization pit 22. Pit 22 is an opening preferably large enough to receive the root structure of an associated plant 24. In the specific embodiment depicted in FIG. 1, pit 22 houses a tree. Fertilization pit 22 can take any of a variety of configurations and/or sizes. Ideally, however, pit 22 should be large enough to allow for the sustained growth of plant 24 over a prolonged period of time. As illustrated, pit 22 can be formed within a concrete or asphalt surface 26. Pit 22 preferably contains a sufficient amount of soil and other particulate materials 28, such as fertilizer, to sustain plant 24 in this otherwise inhospitable concrete/asphalt environment. Any of a variety of materials, both natural and artificial, can be used within the pit. In the preferred embodiment, pit 22 contains a particulate material sold under the tradename "Addapave" by Chameleon Ways, Inc. of Center Valley, Pa.

As further noted in FIG. 1, fertilization pit 22 is bounded by a trench 32. Trench 32 is preferably dug at a depth that is less than the depth of pit 22. Trench 32 accommodates the trough and grate assembly in a manner more fully described hereinafter. Although trench 32 that is depicted in FIG. 1 is rectangular, the system 20 can just as easily be employed in conjunction with trenches of any other shape, size or configuration. For example, system 10 can be carried out in conjunction with a liner trench (i.e. a trench that does not enclose a bounded area) or a circular trench.

Figure 2:
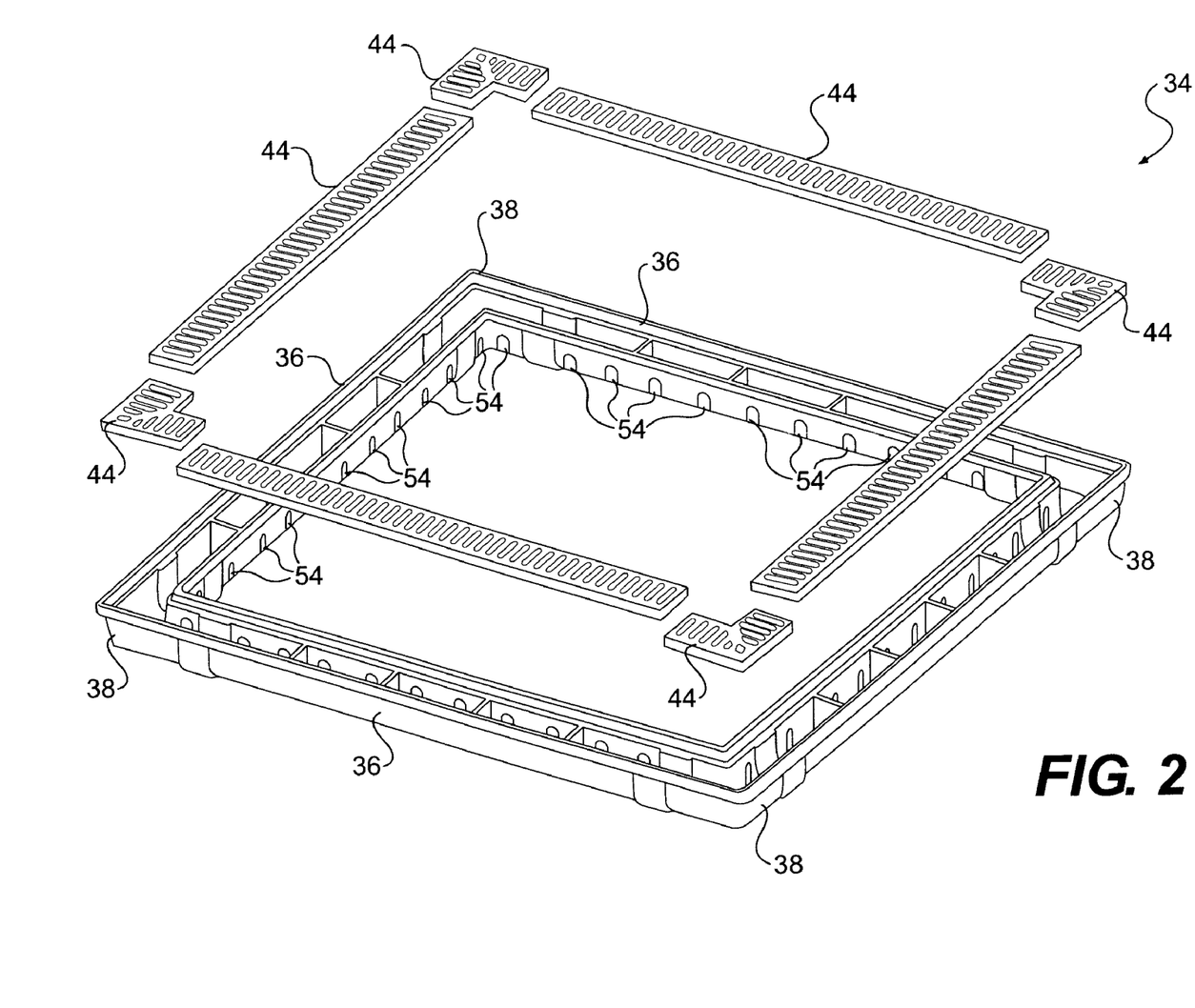
FIG. 2 is a partially exploded view of the improved fertilization grate of the present invention.
Figure 5A:
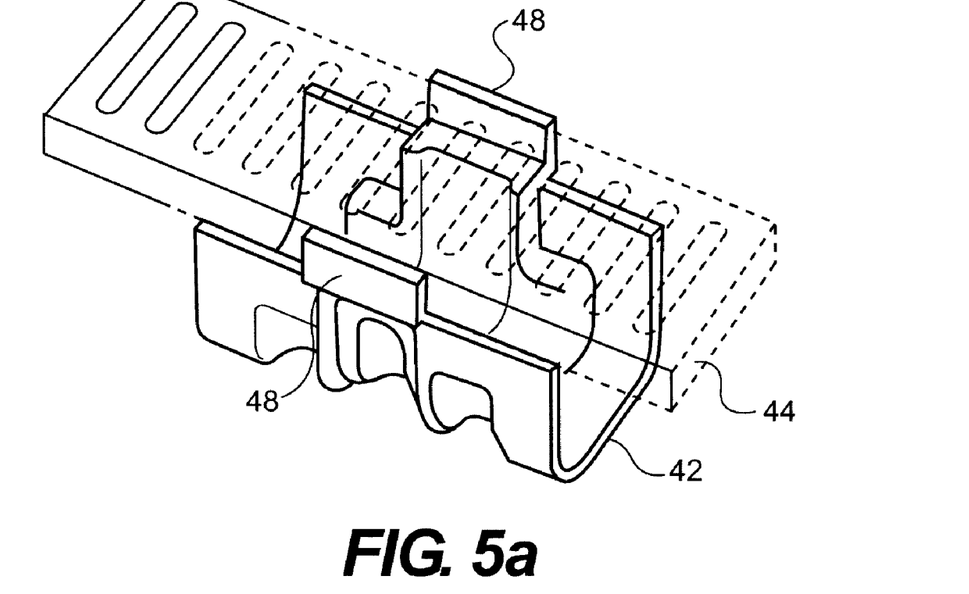
FIGS. 5a-5b are detailed views of the placement of a grate cover upon a linear joint.
Figure 5B:
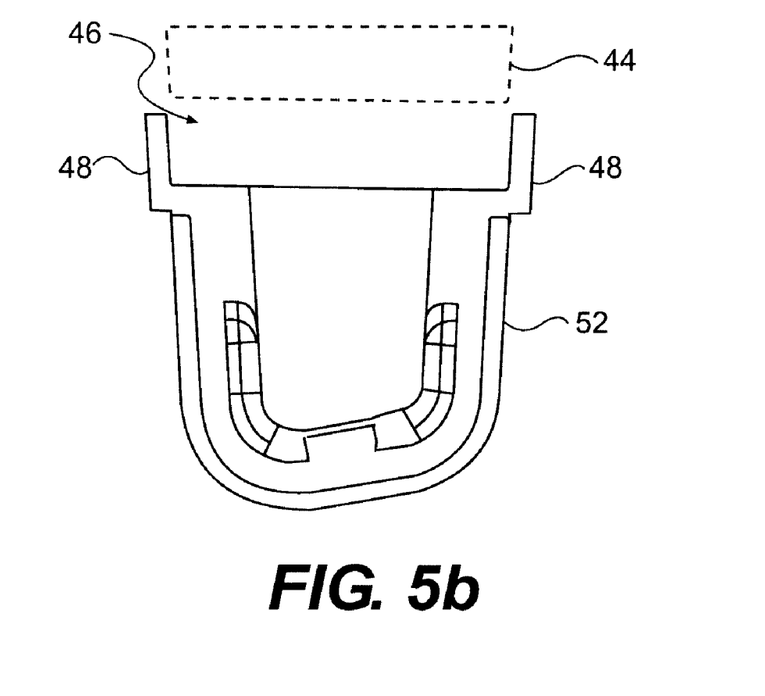
Figure 6A:
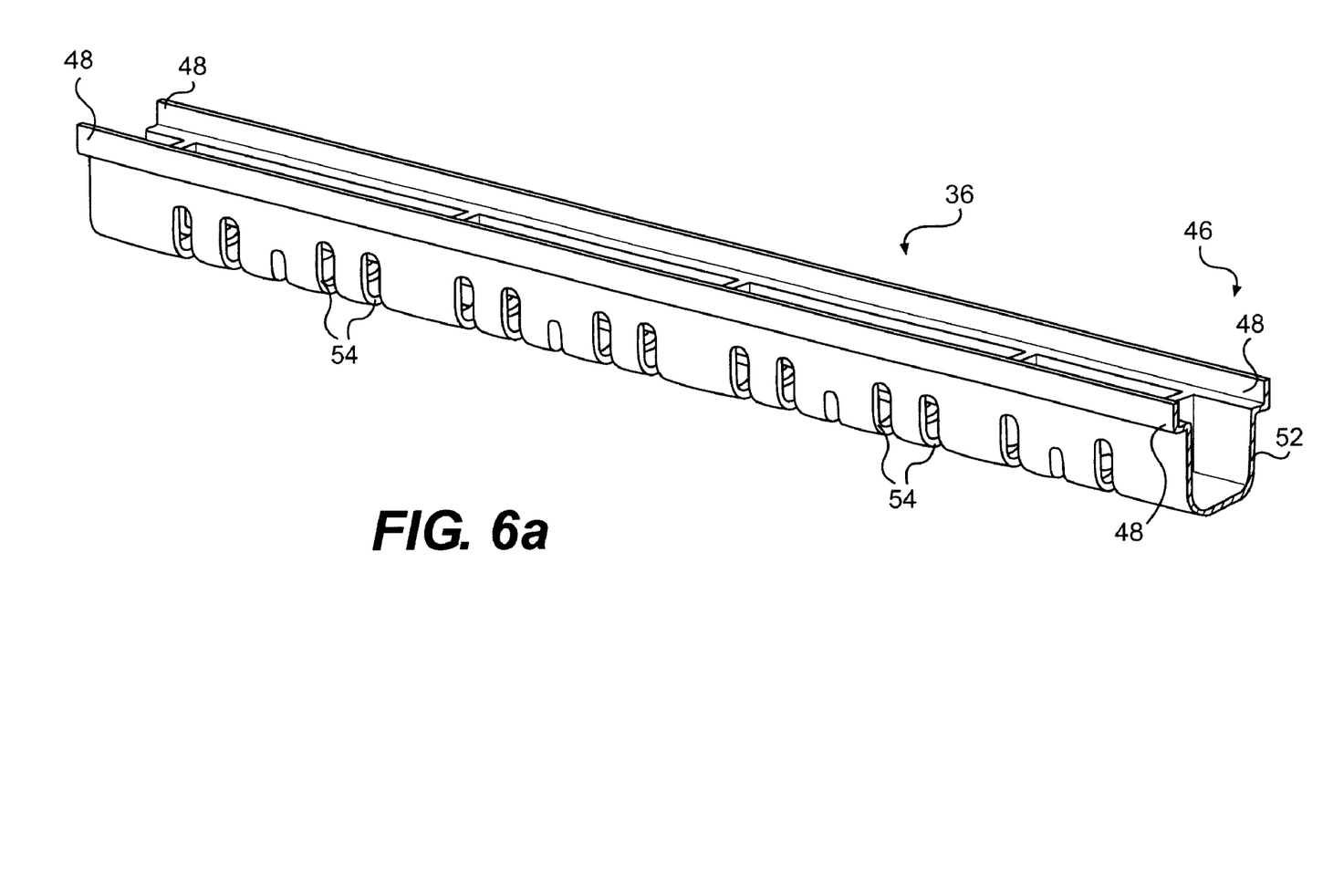
FIGS. 6a-6b are detailed views of the linear section of the multipart trough.

FIG. 2 is a partially exploded view of the multi-part trough 34 that is installed within trench 32 surrounding fertilization pit 22. This multipart trough 34 is formed from a number of interconnecting components. This construction allows troughs of varying sizes and configurations to be easily assembled. In the preferred embodiment multi-part trough 34 is made up of three components: straight linear sections 36 (FIGS. 6a-6b); angled corner pieces 38 (FIGS. 3a-3c); and linear joints 42 (FIGS. 4a-4c). Furthermore, once assembled, these components (36, 38, and 42) are partially covered by way of grate covers 44 (FIGS. 5a-5b). As illustrated, linear sections 36 form the majority of trough assembly 34, whereas corner pieces 38 allow the trough to take on a closed, bounded configuration. Although corner pieces 38 are illustrated as having a 90 degree bend, pieces defining other angles can also be constructed. Additionally, linear joints 42 allow multiple linear sections 36 to be added in an end-to-end fashion as may be necessary to create larger trough configurations. Each of the components (FIGS. 6a-6b, FIGS. 3a-3c, FIGS. 4a-4c) can be cut in the field to achieve an even wider degree of scalability and to accommodate specific shapes and dimensions. This effectively allows any size trench to be build.

Each of the trough components (36, 38, and 42) share similar features. For instance, each of the trough components includes an opened upper end 46 that includes upstanding and opposing L shaped edges 48 (note FIGS. 3a, 4a and 6a) for the purpose of accommodating and associated grate cover 44. In the case of linear sections 36 (FIG. 6a), these L shaped edges 48 span the entire length of the component. However, in the case of corner pieces 38 and joints 42 (FIGS. 3a, 4a), these L shaped edges span only a portion of the intermediate extent. In either case, the opposing L shaped edges 48 cooperate together to form a seat for an associated grate cover 44 as depicted in FIG. 5a.

Figure 6B:
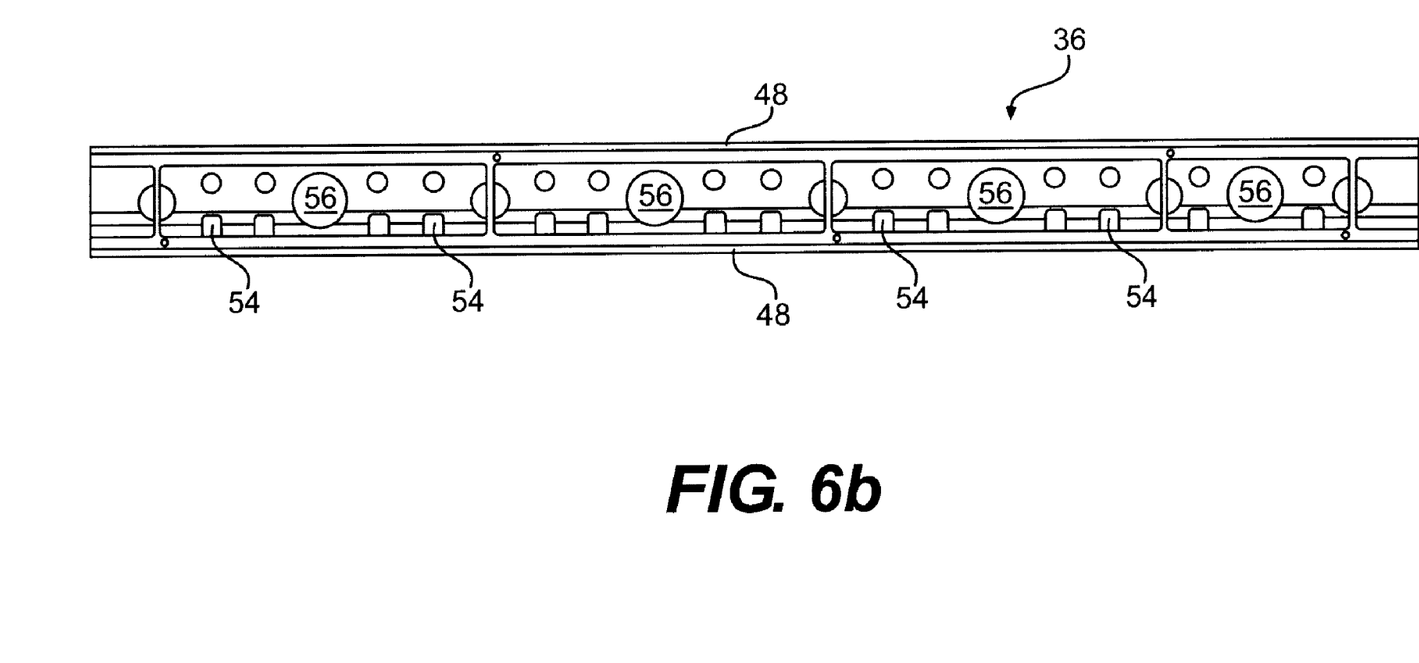

Each of the trough components (36, 38, and 42) further includes a generally U-shaped body 52 that extends between the opposing upper edges 46. U-shaped body 52 is illustrated in the cross-sectional views of FIGS. 1 and 5b. As illustrated, the lower end of each trough component (36, 38, and 42) is closed. Each trough component (36, 38, and 42) further includes a series of arcuate drainage and/or fertilization openings 54 along its length. Although the specific number of drainage apertures 54 is not critical, fourteen drain openings are included along the length of linear section 36 (FIG. 6b). Each trough component (36, 38, and 42) further includes one or more circular apertures 56 within the U-shaped body 52 that likewise can be used for drainage and/or fertilization.

Figure 3A:
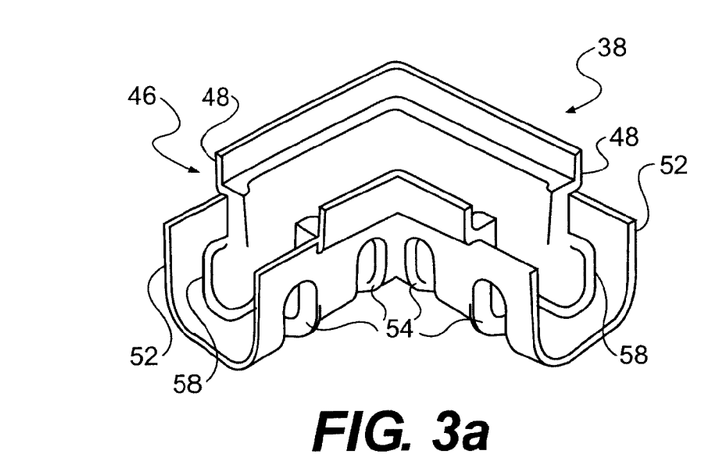
FIGS. 3a-3c are detailed views of one of the corner pieces of the multipart trough.
Figure 3B:
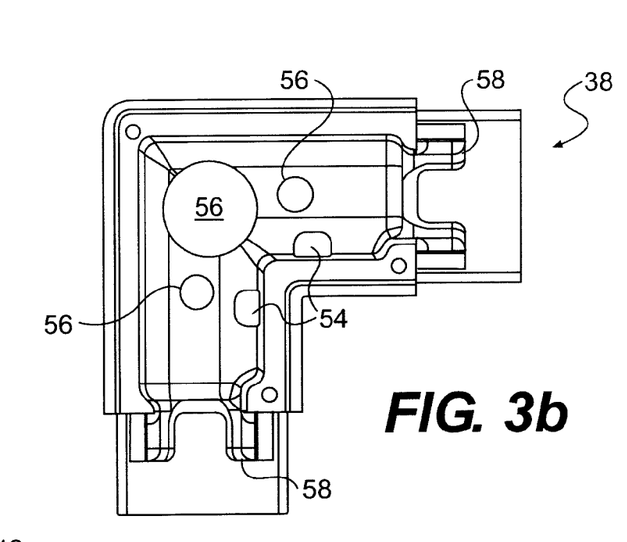
Figure 3C:
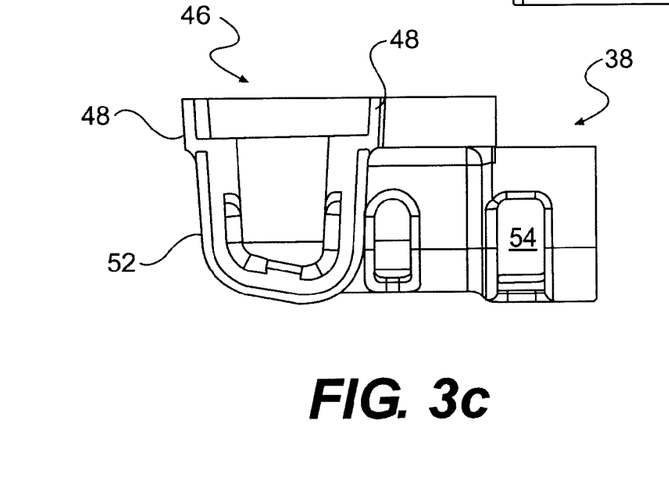
Figure 4A:
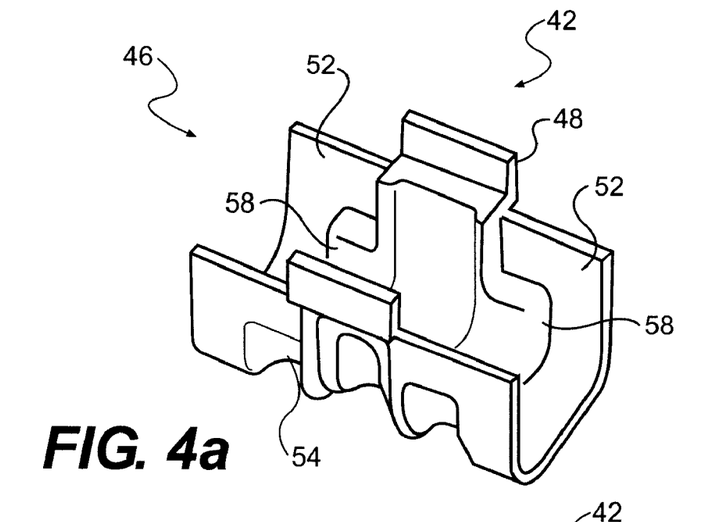
FIGS. 4a-4c are detailed views of the linear joint of the multipart trough.
Figure 4B:
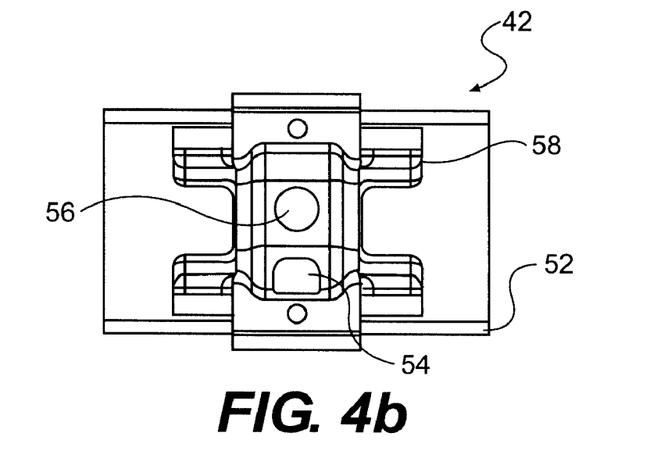
Figure 4C:
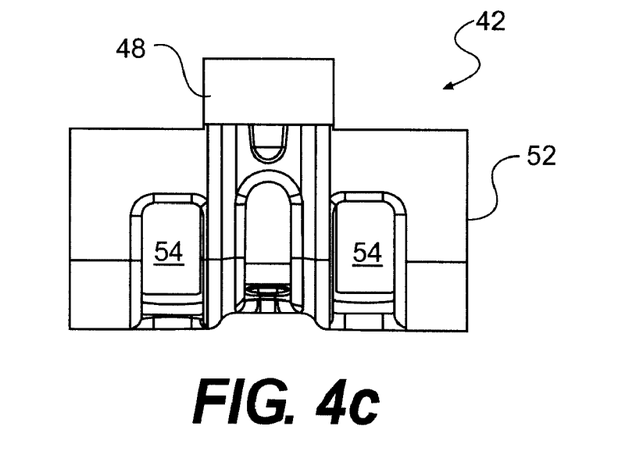

With reference now to FIGS. 3a and 4a, the corner pieces 38 and linear joints 42 are depicted in greater detail. Each of these components (38 and 42) includes opposing resilient tabs 58 that are employed in securing the component (38 and 42) to adjacent linear sections 36. Tabs 58 are preferably formed at a location inward of the opposing edges. In the preferred embodiment, tabs 58 extend outwardly from the stepped edges that, in turn, make up the opposing L-shaped edges 48. In order to accommodate an adjacent linear section 36, the overall width of the corner pieces 38 and linear joints 42 is generally larger than the width of the linear sections 36. This arrangement allows either end of a linear section 36 to be inserted within either end of an associated corner piece 38 or linear joint 42. Furthermore, tabs 58 on the corner pieces 38 and linear joints 42 are dimensioned to be lockingly and resiliently positioned over the associated U-shaped body 52 of the linear section 36. In this fashion, the ends of the linear section 36 are engaged within the tabs 58 of either a corner piece 38 or linear joint 42 in a tongue and groove arrangement. FIG. 2 illustrates a fully assembled trough assembly 34 with the linear sections 36 and corner pieces 38 interconnected.

In use, the area around the fertilization pit 22 is measured to determine how large a trough assembly 34 is needed. Thereafter, a suitable sized trench 32 is dug around pit 22. In the next step, the trough components (36, 38, and 42) are assembled in a size and configuration that matches the trench 32. Namely, extended linear lengths can be created by joining two or more individual linear sections 36 in an end to end relationship by way of the linear joints 42. More specifically, two ends of adjacent linear sections 36 can be brought together in an end-to-end relationship by engaging each end within the tabs 58 of an intermediate linear joint 42. Likewise, the ends of adjacent linear sections 36 can be brought together at an angle by positioning the ends of the linear section 36 within opposing ends of a corner piece 38. Again, the various components are retained in place via tabs 58 that create an interlocking tongue and groove relationship. Once an appropriately sized trough is assembled, it is then positioned within trench 32.

Figure 7A:
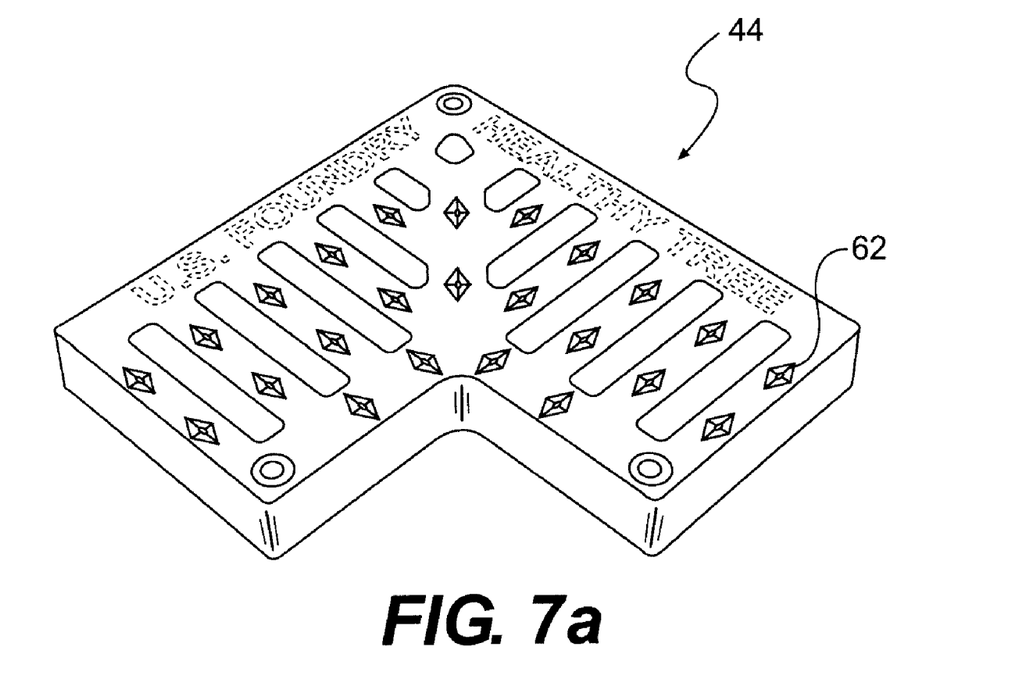
FIGS. 7a-7b are detailed views of one of the grate covers of the present invention.
Figure 7B:
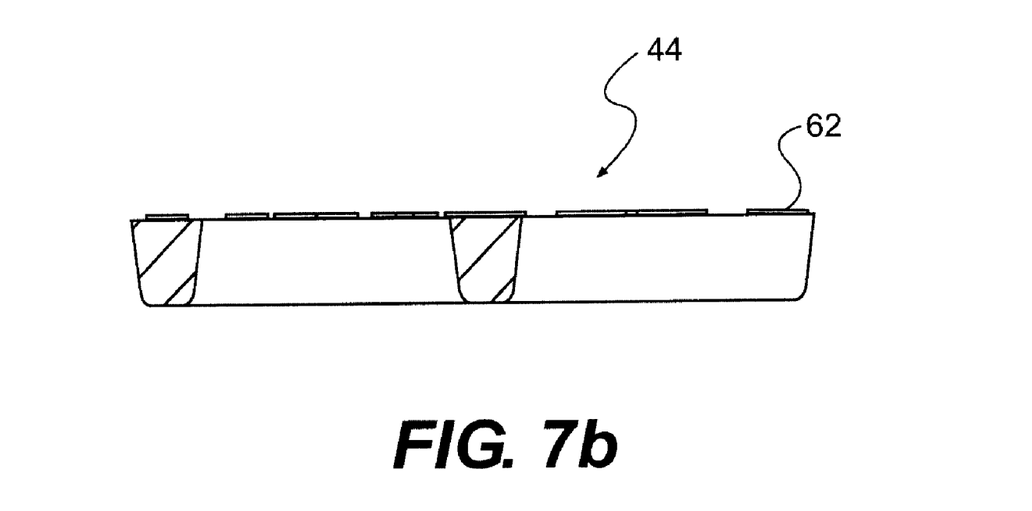

The opened upper end of the assembled trough is then closed by a series of grate covers 44. These grate covers 44 generally have a size corresponding to the linear sections 36, corner pieces 38 and linear joints 42 of trough assembly 34. Furthermore, as noted in FIGS. 7a and 7b, each of the grate covers 44 includes a top textured surface 62 to accommodate foot traffic. Grates 44 will be of a molded material with a surface pattern that conforms to the Americans with Disabilities Act. It is important to note that covers 44 have a width that corresponds to the spacing between adjacent L shaped edges 48. This allows covers 44 to be received within the seat formed by the adjacent L-shaped edges 48 of an individual trench component (36, 38, and 42) (FIG. 5a). Additional fasteners may be employed to secure cover 44 in place upon the underlying trough component (36, 38, and 42). Ideally, trench 32 is deep enough such that the properly positioned grate covers 44 are at ground level.

In use, a particulate fertilization material can be positioned within the trough assembly 34 either by passing the particulate material through grate 44 or by removing grate cover 44 and putting the particulate material directly within the trough 34. Thereafter, when water enters through the trough—either rainwater runoff or as a result of spraying—the material will be washed through the u-shaped body 52 of the trough and out the associated drainage apertures 54 and 56. This will allow the particulate material to be washed into the fertilization pit 22 where it is used in providing hydration and nutrition to the root structure of the plant 24.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A plant and root fertilization system for use within a paved surface comprising:

a fertilization pit for containing the roots of the plant, the pit being filled with soil and being bounded by a rectangular trench;

a multipart trough positioned within the trench, the trough including a number of linear sections, corner pieces and linear joints, each of which includes upper opposing L-shaped edges that form a seat, a U-shaped body intermediate the L-shaped edges, and a series of drainage apertures formed within the u-shaped body, the corner pieces and linear joints further including opposed tabs formed within the u-shaped body, the u-shaped body of the linear sections being inserted into the tabs of the corner pieces; and a series of grate covers, each of the covers including a top textured surface and being positioned within the seat of an associated linear section, corner piece or linear joint of the multi-part trough;

a particulate fertilization material positioned within the multipart trough such that when water enters the trough through the grate cover, the material is washed out of the trough through the drainage apertures and into the fertilization pit.

2. A plant and root fertilization system comprising:

a fertilization pit for containing the roots of the plant, the pit being filled with a particulate fertilization material and being bounded by a trench;

a trough assembly including a number of linear sections and corner pieces that are assembled into a closed configuration via a tongue in groove interconnection, the linear sections and corner pieces each including a series of drainage apertures, the trough assembly being positioned within the trench such that the drainage apertures are in fluid communication with the fertilization pit;

a series of grate covers removably positioned over the linear sections and corner pieces to thereby cover the entire trough assembly;

a particulate fertilization material positioned within the trough such that when water enters the trough assembly through the grate covers, the material is washed out through the drainage apertures and into the fertilization pit.

3. The plant and root fertilization system as described in claim 2 wherein the trough assembly includes liner joints in addition to the linear sections and corner pieces and wherein the linear joints, linear sections and corners pieces all include U-shaped bodies.

4. The plant and root fertilization system as described in claim 2 further comprising a tab that is formed within each of the corner pieces and wherein the linear sections include a u-shaped body and wherein the tongue in groove connection comprises inserting the tab over and adjoining u-shaped body.

5. The plant and root fertilization system as described in claim 2 wherein the grate covers include a top textured surface.

* * * * *